(12) United States Patent
Cheong Zhi Xi et al.

(10) Patent No.: US 12,450,043 B2
(45) Date of Patent: Oct. 21, 2025

(54) EFFICIENTLY VECTORIZED IMPLEMENTATION OF OPERATIONS IN A GLOBAL GRID INDEXING LIBRARY

(71) Applicant: Databricks, Inc., San Francisco, CA (US)

(72) Inventors: Desmond Cheong Zhi Xi, San Francisco, CA (US); Menelaos Karavelas, San Ramon, CA (US)

(73) Assignee: Databricks, Inc., San Francisco, CA (US)

( * ) Notice: Subject to any disclaimer, the term of this patent is extended or adjusted under 35 U.S.C. 154(b) by 181 days.

(21) Appl. No.: 18/501,839

(22) Filed: Nov. 3, 2023

(65) Prior Publication Data

US 2024/0152338 A1 May 9, 2024

Related U.S. Application Data

(60) Provisional application No. 63/426,341, filed on Nov. 17, 2022.

(30) Foreign Application Priority Data

Nov. 4, 2022 (GR) ............................... 20220100900

(51) Int. Cl.
    *G06F 8/41* (2018.01)
(52) U.S. Cl.
    CPC .................................... *G06F 8/452* (2013.01)
(58) Field of Classification Search
    CPC ....................................................... G06F 8/452
    See application file for complete search history.

(56) References Cited

U.S. PATENT DOCUMENTS

| | | | | |
|---|---|---|---|---|
| 9,244,677 | B2 * | 1/2016 | Vasudevan | G06F 8/452 |
| 12,333,264 | B1 * | 6/2025 | Hoang | G06F 40/58 |
| 2008/0104005 | A1 * | 5/2008 | Dalton | G06Q 10/00 |
| | | | | 706/45 |
| 2008/0154829 | A1 * | 6/2008 | Dalton | G06N 3/126 |
| | | | | 707/E17.014 |
| 2011/0144962 | A1 * | 6/2011 | Blask | G06T 17/05 |
| | | | | 703/6 |
| 2014/0280064 | A1 * | 9/2014 | McDougall | G06N 5/04 |
| | | | | 707/769 |

(Continued)

FOREIGN PATENT DOCUMENTS

| | | | | |
|---|---|---|---|---|
| CN | 115310831 A | * | 11/2022 | G06N 3/08 |
| CN | 115981550 A | * | 4/2023 | |

*Primary Examiner* — Philip Wang
*Assistant Examiner* — Rongfa P Wang
(74) *Attorney, Agent, or Firm* — Fenwick & West LLP

(57) ABSTRACT

A data processing service generates for iteratively applying a geospatial function to geospatial data. The generated code includes at least a first iterative loop and a second iterative loop. The data processing service compiles the generated code to generate compiled code that vectorized at least the second iterative loop. The data processing service receives a request from a client device to perform one or more data processing operations including applying the geospatial function to a data table of geospatial cell indices. The data processing service compiles the request into one or more tasks including at least a vectorized operation based on the compiled code and executes the one or more tasks by at least invoking the vectorized operation on the set of worker nodes.

20 Claims, 13 Drawing Sheets

650

```
Status DecomposedEvalBatch(const uint64_t* cell, const int32_t* res,
                          Output* output) {
  for (int i = 0; i < BATCH_SIZE; ++i) {
    int idx = GetActiveRow(i);
    RETURN_IF_STATUS_NOT_OK(ValidateInputs(cell[idx], res[idx]);
  } for (int i = 0; i < BATCH_SIZE; ++i) {
    int idx = GetActiveRow(i);
    EvaluateFunction(cell[idx], res[idx], &output[idx]);
  }
  return Status::OK();
}
```

(56) References Cited

U.S. PATENT DOCUMENTS

| | | | |
|---|---|---|---|
| 2019/0278577 A1* | 9/2019 | Plotnikov | G06F 8/452 |
| 2022/0207796 A1* | 6/2022 | Bowdler | G06T 7/11 |
| 2023/0289045 A1* | 9/2023 | Malhotra | G06T 11/206 |
| 2023/0367811 A1* | 11/2023 | Bhimani | G06F 16/909 |
| 2024/0020322 A1* | 1/2024 | Bhimani | G06F 16/29 |
| 2025/0028700 A1* | 1/2025 | Veselova | G06F 16/2246 |

* cited by examiner

```
Result Function(uint64_t cell, int32_t resolution) {
    // Check if the cell is within bounds and throw an error if not.
    if (!IsWithinBounds(cell)) return Status::InvalidCellError(cell);
    if (!IsValidResolution(cell, resolution)) {
        return Status::InvalidResolutionError(cell, resolution);
    }
    // Evaluate the result.
    return EvalFunction(cell, resolution);
}
```

```
Status DecomposedEvalBatch(const uint64_t* cell, const int32_t* res,
                            Output* output) {
    for (int i = 0; i < BATCH_SIZE; ++i) {
        int idx = GetActiveRow(i);
        RETURN_IF_STATUS_NOT_OK(ValidateInputs(cell[idx], res[idx]));
    }
    for (int i = 0; i < BATCH_SIZE; ++i) {
        int idx = GetActiveRow(i);
        EvaluateFunction(cell[idx], res[idx], &output[idx]);
    }
    return Status::OK();
}
```

```
constexpr Cell ToParent (int32_t resolution) {
  // Mask for clearing the resolution bits so that we can set the new resolution.
  constexpr uint64_t kClearMask = ~kResolutionMasks [15];
  // Clear resolution bits (AND-op), set new resolution and unused bits (OR=op).
  return Cell ((value_ & kClearMask) | kResolutionMask [resolution]);
}
```

FIG. 8C

```
for (int r = 1; r <= res; r++) {
    Direction digit = H3_GET_INDEX_DIGIT(h, r);
    if (digit < CENTER_DIGIT || digit >= NUM_DIGITS) return 0;
}
```

FIG. 10A

```
bool has_invalid_digit = ((value & kDigitMasks[1]) == kDigitMasks[1]);
for (int32_t i = 2; i <= kResolution; ++i) {
    has_invalid_digit |= ((value & kDigitMasks[i]) == kDigitMasks[i]);
}
if (has_invalid_digit) return false;
```

FIG. 10B

EFFICIENTLY VECTORIZED IMPLEMENTATION OF OPERATIONS IN A GLOBAL GRID INDEXING LIBRARY

CROSS-REFERENCE TO RELATED APPLICATIONS

This application claims the benefit of Greek Application No. 20220100900, filed on Nov. 4, 2022, and U.S. Provisional Application No. 63/426,341, filed on Nov. 17, 2022, both of which are incorporated by reference in its entirety.

TECHNICAL FIELD

The disclosed configuration relates generally to data asset sharing, and more particularly to vectorization of data in a geospatial library.

BACKGROUND

Some geospatial code libraries offer a hierarchical global grid system that represents geographic objects on the surface of the Earth. These geographic objects may be points on the surface (e.g., locations on the Earth), polygons (e.g., areas on the Earth), or multipolygons (e.g., collections of areas on the Earth. For example, a geospatial library tessellates the spherical surface of the Earth into hexagons and pentagons at various resolutions. However, functions that call for particular geospatial cells require a significant amount of processing time and capacity. Accordingly, there exists a need for improving the vectorization of operations in a geospatial library in response to a function requested by a user.

BRIEF DESCRIPTION OF THE DRAWINGS

FIG. 6A illustrates computer program code 600 for a standard geospatial function, in accordance with an embodiment.

FIG. 6B illustrates computer program code 650 for a decomposed geospatial function, in accordance with an embodiment.

FIG. 8C illustrates a vectorization-eligible computer program code for a geospatial function requesting a cell index at a different resolution than that an input cell index, in accordance with an embodiment.

FIG. 10A illustrates computer program code for a standard geospatial function for validating digits of a cell index, in accordance with an embodiment.

FIG. 10B illustrates computer program code for unwrapping an iterative validation function, in accordance with an embodiment.

The figures depict various embodiments of the present configuration for purposes of illustration only. One skilled in the art will readily recognize from the following discussion that alternative embodiments of the structures and methods illustrated herein may be employed without departing from the principles of the configuration described herein.

DETAILED DESCRIPTION

Overview

A data processing service performs one or more optimizations to the functions of the geospatial library to generate code such that when compiled and executed, at least portions of the operations on the data are vectorized to speedup execution via parallel processing and enhance computational efficiency. In one embodiment, as described in further detail below, vectorization of an operation refers to when a compiler generates instructions such that a single operation simultaneously processes multiple operands instead of a single operation processing a single operand. As an example, instead of iterating through a for loop row by row, the compiler generates instructions for executing the operation for a batch of rows (e.g., data for 4 rows) simultaneously in parallel within the central processing unit (CPU).

Data Processing Service System Environment

Figure 1:
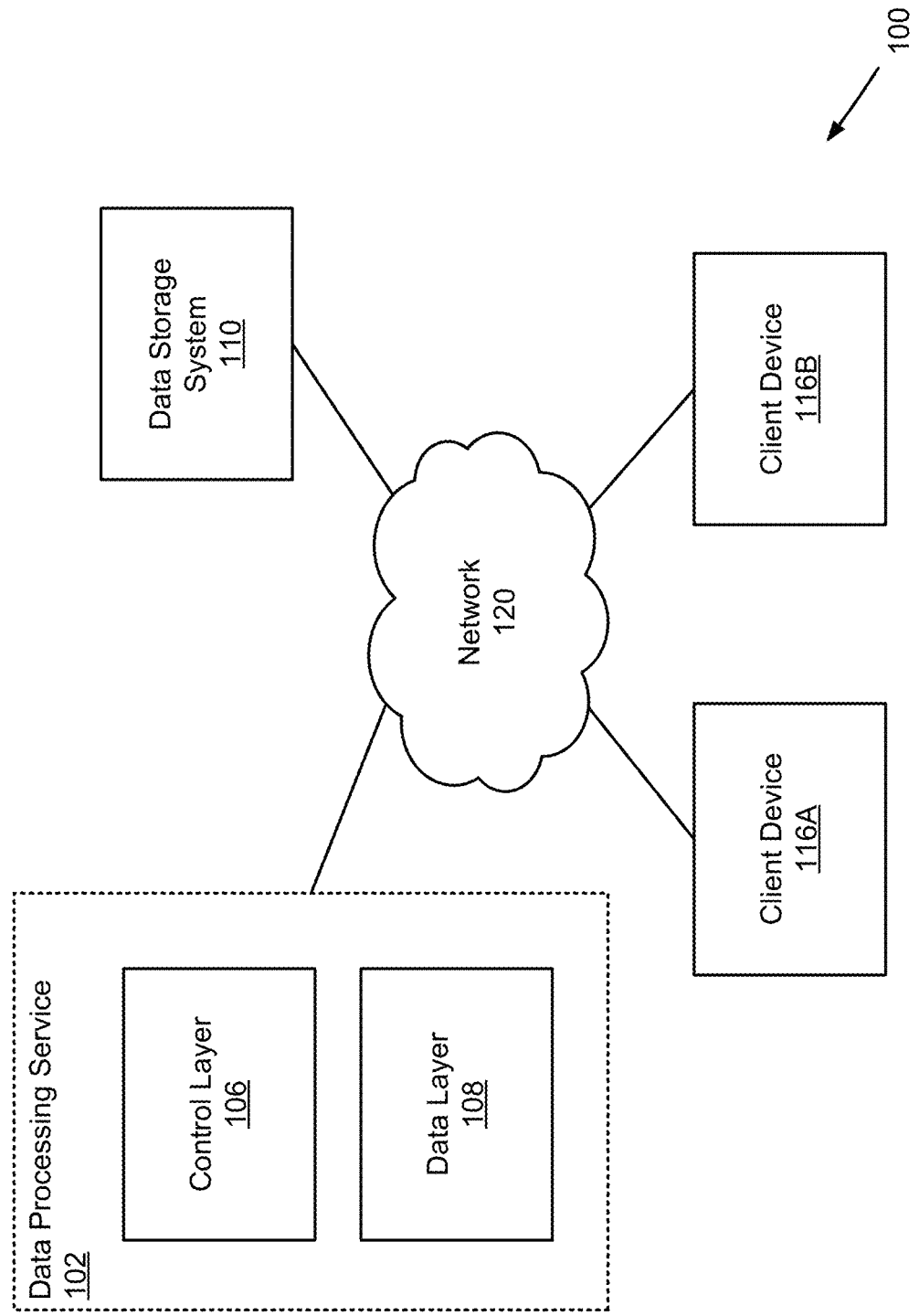
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system 402 is described in relation to FIG. 4. In one instance, the clusters of computing resources are virtual machines or virtual data centers configured on a cloud infrastructure platform. In one instance, the data layer 108 is configured such that a plurality of data layer instances process data pertaining to various tenants of the data processing service 102, where a data layer of a respective tenant may reside within its own virtual private cloud (VPC) network. Each tenant's data is isolated and remains invisible to other tenants. For example, a respective data layer instance can be implemented for a respective tenant.

Data layer 108 thus may be accessed by, for example, a developer through an application of control layer 106 to execute code developed by the developer. In one embodiment, a cluster in data layer 108 may include multiple worker nodes that execute multiple jobs in parallel. Responsive to receiving a request, data layer 108 divides the cluster computing job into a set of worker jobs, provides each of the worker jobs to a worker node, receives worker job results, stores job results, and the like. Data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

In some embodiments, components of the control layer 106 may receive a request from a user to apply a geospatial function to a batch of data, for example to determine the location of geographic objects on Earth, retail planning, transportation and delivery, agriculture, telecom-related applications, and the like. In such embodiments, the data of the user may include a plurality of data instances (e.g., rows) that each store a geospatial cell, a resolution of the geospatial cell, and other information associated with the data instance stored at the data storage system 110.

Specifically, a geospatial cell is an object of a hierarchical global grid system and may be of various resolutions, where a geospatial cell of a lower resolution corresponds to a larger polygon covering a geographic region (e.g., city of San Francisco), and a geospatial cell of a higher resolution corresponds to a smaller polygon covering a smaller geographic region (e.g., particular building in downtown San Francisco). In one instance, a geospatial cell is hierarchical in the sense that a parent geospatial cell (covering a geographic region) may correspond in a unique way to multiple child geospatial cells at the next resolution that each cover smaller geographic regions. The user may encode a geographical region of a particular resolution as a corresponding geospatial cell available at the given resolution, and a given geospatial cell may be assigned a unique index (e.g., 64-bit integer). Geographic objects may be points on the surface (e.g., locations), polygons on the surface (e.g., areas of the Earth), or multi-polygons on the surface (e.g., collections of areas).

Accordingly, in one embodiment, the data processing service 102 is configured with a geospatial library of a collection of functions that users can use to submit data processing operations on geospatial data. For example, the functions in the geospatial library are tailored to the geospatial cell indices. For example, the data processing service 102 may receive a user request to determine if long integer values in a data table are all valid cell indices via a "IsValid" function. As another example, a query may determine whether a point lies approximately inside a polygon by determining whether the cell corresponding to the point at a specific resolution is one of the cells covering the polygon at the same resolution.

In one embodiment, the control layer 106 of the data processing service 102 performs one or more optimizations to the functions of the geospatial library to generate code such that when compiled and executed, at least portions of the operations on the data are vectorized to speedup execution via parallel processing and enhance computational efficiency. In one embodiment, as described in further detail below, vectorization of an operation refers to when a compiler generates instructions such that a single operation simultaneously processes multiple operands instead of a single operation processing a single operand. As an example, instead of iterating through a for loop row by row, the compiler generates instructions for executing the operation for a batch of rows (e.g., data for 4 rows) simultaneously in parallel within the central processing unit (CPU).

Data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102. In one embodiment, the data storage system 110 includes an authentication service that verifies whether an access request from a cluster computing resource to access one or more data assets (e.g., data tables, metadata) is appropriate based on the trust and permission policies associated with the account associated with the request. Client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client device 116 is a conventional computer system, such as a desktop or laptop computer. Alternatively, client device 116 may be a device having computer functionality, such as a personal digital assistant (PDA), a mobile telephone, a smartphone or another suitable device. A client device 116 is configured to communicate via network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Figure 2:
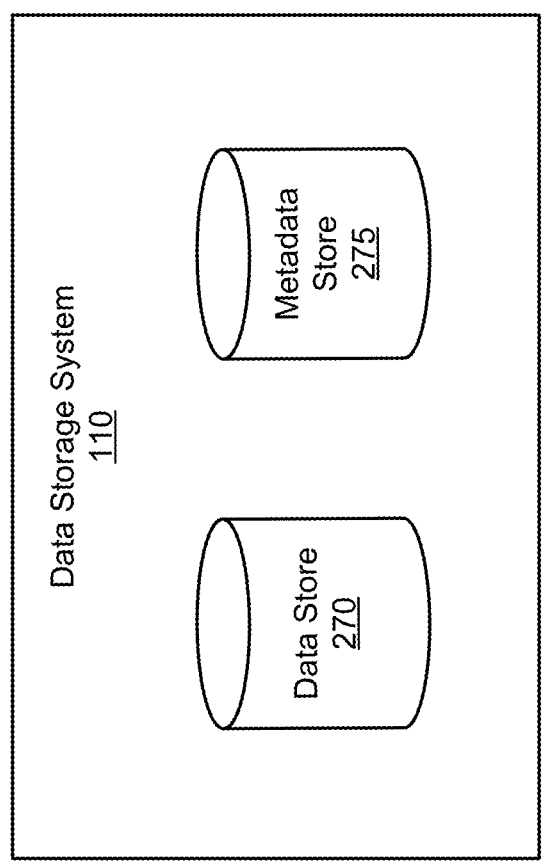
FIG. 2 illustrates a block diagram of an architecture of a data storage system, in accordance with an embodiment.

FIG. 2 is a block diagram of an architecture of a data storage system 108, in accordance with an embodiment. In one embodiment, the data storage system 108 includes a data ingestion module 250. The data storage system 108 also includes a data tables store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, users of the data processing service 102 may store data tables including a plurality of geospatial data instances. As an example, a data table may store one or more data instances as a plurality of rows, where each instance stores data including at least a particular geospatial cell index, a resolution of the cell index, and the like. As described in further detail below, the geospatial cell indices may be represented as 64-bit integers, unique to each cell encoding a particular region on the map at a particular resolution. The users of the data processing service 102 may request jobs, such as queries, on the geospatial data.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that includes another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity and may indicate the specific changes to individual records with an indication of whether the record was inserted, deleted, or updated due to the corresponding transaction.

Figure 3:
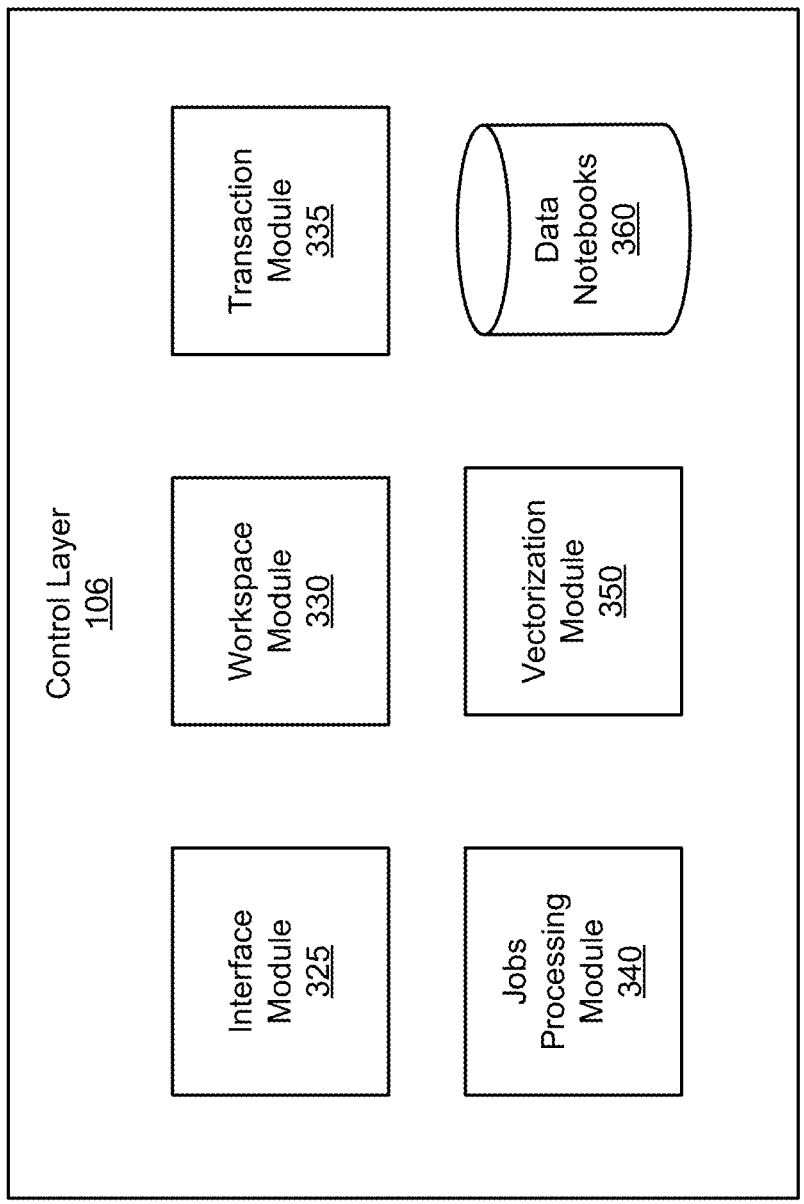
FIG. 3 illustrates a block diagram of an architecture of a control layer, in accordance with an embodiment.

FIG. 3 is a block diagram of an architecture of control layer 106, in accordance with an embodiment. In one embodiment, data processing system 106 includes interface module 325, workspace module 330, transaction module 335, jobs processing module 340, and cluster management module 345, and vectorization module 350. The control layer 106 also includes a data notebook store 360.

Interface module 325 provides an interface and/or a workspace environment where users of client devices 116 (e.g., users associated with tenants) can access resources of data processing service 102. For example, the user may retrieve information from data tables associated with a tenant, submit data processing requests such as query requests on the data tables, through the interface provided by interface module 325. The interface provided by interface module 325 may include notebooks, libraries, experiments, queries submitted by the user. In one embodiment, a user may access the workspace via a user interface (UI), a command line interface (CLI), or through an application programming interface (API) provided by workspace module 330.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

Workspace module 330 deploys workspaces within data processing service 102. A workspace as defined herein may refer to a deployment in the cloud that functions as an environment for users of the workspace to access assets. An account of data processing service 102 represents a single entity that can include multiple workspaces. In one embodiment, an account associated with data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

Transaction module 335 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

Jobs processing module 340 receives and processes queries that access data stored by data storage system 110. Jobs processing module 340 may reside in control layer 106. In one instance, jobs may include queries on data, workflows, extract, transform, and load (ETL) jobs, and the like. The queries processed by jobs processing module 340 are referred to herein as database queries. The database queries are specified using a declarative database query language such as SQL. Jobs processing module 340 may encounter runtime errors during execution of a database query and returns information describing the runtime error including an origin of the runtime error representing a position of the runtime error in the database query. In one embodiment, jobs processing module 340 provides one or more queries to appropriate clusters of data layer 108 and receives responses to the queries from clusters in which the queries are executed.

The jobs processing module 340 receives, from users, requests to perform one or more data processing operations on a data table. In one embodiment, the jobs processing module 340 receives a request to apply one or more geospatial functions (e.g., a data processing operation) from a geospatial library (e.g., a data table). For example, the geospatial function may be applied to identify a location on the surface of the Earth. Specifically, the geospatial functions are operations on geospatial cell indices that each cover a geographical region at a given resolution.

In one embodiment, the geospatial library assumes geospatial cells tessellate a spherical surface of the Earth in hexagons and pentagons. As described herein, the tessellated polygons of the geospatial library are referred to as "cells." The geospatial cells may represent geographical regions at varying resolutions ranging from resolution 0 up to resolution 15 where resolution 0 is the coarsest possible resolution consisting of 122 cells and resolution 15 is the least coarse possible resolution consisting of about 570 billion cells. For example, the most coarse cells may correspond to surface areas of about 4.3 million square kilometers whereas the most fine cells correspond to surface areas of about 0.9 square meters. At resolution 0, the surface of the Earth is divided into a set of base cells (e.g., a combination of hexagons and pentagons). At resolution 1, each hexagonal base cell corresponds to 7 child cells, whereas each pentagonal base cell corresponds to 6 child cells. At resolution 2, each child cell from resolution 1 corresponds to 7 or 6 child cells, depending on whether it is a hexagon or pentagon, respectively. The geospatial cells are further organized at deeper levels of granularity at each subsequent resolution up to resolution 15.

For the sake of explanation, the embodiments and techniques described herein are described with reference to a geospatial library with resolutions ranging from 0 to 15, but a person of ordinary skill in the art would appreciate that the techniques described herein could be applied to any similarly organized geospatial library.

Figure 5A:
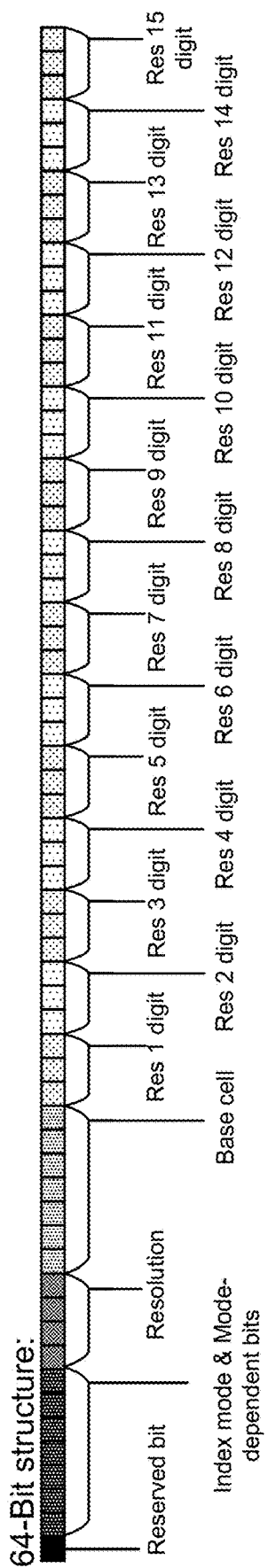
FIG. 5A illustrates a template for a 64-bit geospatial cell index in a geospatial library, in accordance with an embodiment.

FIG. 5A illustrates a template for a 64-bit geospatial cell index in a geospatial library, in accordance with an embodiment. Each cell of the geospatial library is identified using a unique cell index. In one embodiment, each cell is represented as a 64-bit integer where a particular digit specifies the user's resolution of interest and subsequent digits identify the cell at the specified resolution. As described herein, a digit refers to a set of bits, for example a digit consists of 3 bits in the cell index. In the illustrated embodiment, a resolution digit specifies the resolution. The base cell digit specifies a unique identifier of a base cell at resolution 0 (e.g., the cell containing the desired location at resolution 0). The Res 1 digit specifies a child cell at resolution 1 corresponding to a base cell from resolution 0, the Res 2 digit specifies a child cell at resolution 2 corresponding to a child cell from resolution 1, and so on through the digit that specifies a child cell at resolution 15. Missing resolutions in a cell index may be specified with a particular 3-digit code.

Figure 5B:
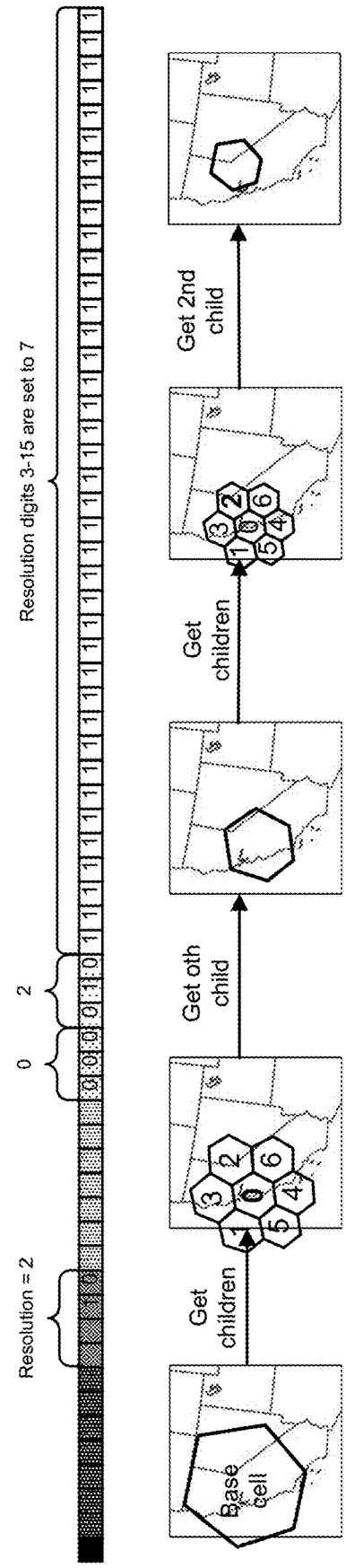
FIG. 5B illustrates an example 64-bit geospatial cell index at resolution 2, in accordance with one embodiment.

FIG. 5B illustrates an example 64-bit geospatial cell index at resolution 2, in accordance with one embodiment. In the illustrated cell index, the resolution digit specifies resolution 2. The base cell digit specifies the illustrated base cell (cell illustrated in first image of FIG. 5B). As discussed above, the base cell contains six or seven child cells. For parent cells containing six child cells, the child cells are numbered 0 and 2 to 6 at resolution 1 (e.g., the index 1 is not used). For parent cells containing seven child cells, the child cells are numbered 0 to 6 at resolution 1. The Res 1 digit specifies the 0th child cell at resolution 1. As described with reference to the base cells, the 0th child cell contains six or seven child cells of its own numbered either 0 and 2 to 6, or 0 to 6 at resolution 2. The Res 2 digit specifies the 2nd child cell at resolution 2. The remaining digits pertaining to the remaining resolutions (e.g., resolutions 3 to 15) are set to value 7, which indicates that the remaining resolutions are inapplicable for the cell index. If, for example, the cell index in FIG. 5B specified resolution 3, the digit for resolution 3 would read a value between 0 and 6 and remaining resolutions 4 to 15 would be set to the value of 7.

In one embodiment, the job requests received by the jobs processing module 340 are queries on data tables, and more specifically, geospatial functions on data tables that include a plurality of data instances each with geospatial data. In one instance, example geospatial functions include IsChildOf, IsPentagon, IsValid,MaxChild,MinChild, Resolution, ToParent, ToChildren, Try_Validate, Validate, and the like. The jobs processing module 340 may process a query request (e.g., in the form of user SQL code) and provide the query to the cluster computing system 402 of a data layer 108 associated with the user. The jobs processing module 340 receives a response to the query request from the cluster computing system 402 and returns the response to the user.

Figure 5C:
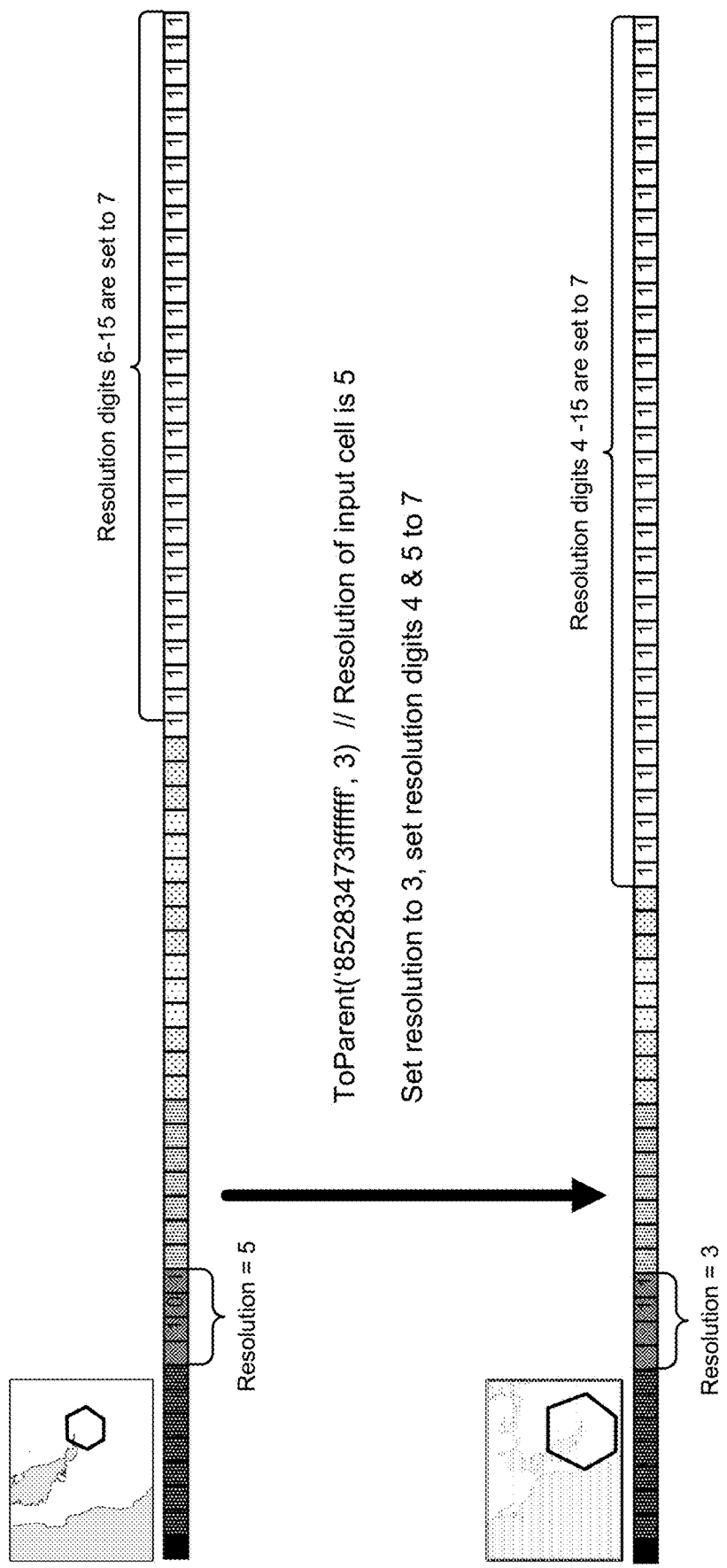
FIG. 5C illustrates two 64-bit geospatial cell indices involved in a geospatial function, in accordance with an embodiment.

FIG. 5C illustrates two 64-bit geospatial cell indices involved in a geospatial function, in accordance with an embodiment. For reference, the geospatial function "ToParent" calls for the jobs processing module 340 to determine an identifier of a parent cell at a specified resolution for a given child cell. In the illustrated example, the top cell index is a cell at resolution 5. Accordingly, the resolution digit specifies resolution 5, the digits for resolutions 0 to 5 represent the unique identifier of the child cell, and the digits for resolutions 6 to 15 are set to the invalid value (e.g., 7). The invalid value may also be referred to as an "inapplicable value." The jobs processing module 340 receives a geospatial function "ToParent" with inputs "(0x085283473ffffff, 3)". Accordingly, the jobs processing module 340 determines the cell index for the parent cell at resolution 3 (e.g., the bottom cell index) that is obtained by modifying the resolution digit from the cell index of the child cell to specify resolution 3 and setting the values of resolutions 4 and 5 to the invalid value (e.g., 7).

Returning to FIG. 3, the vectorization module 350 compiles code for certain geospatial functions to generate a vectorized implementation of the geospatial function. Specifically, vectorization is the process in which computer program code is converted from a scalar implementation where a single operation processes a single operand into a vector implementation where a single operation simultaneously processes multiple operands. For example, a scalar implementation of a loop would perform the operation n times for each n pairs of elements whereas a vector implementation would perform the addition operation on multiple pairs of elements at a time. Accordingly, the vectorized form of a computer program code optimizes the processing time required to execute the code. For example, a scalar implementation of an addition operation would perform the addition operation n times for each n pairs of elements at a time. For example, if each element in a data table is a 64-bit integer and the executor node is a 256-bit register, a single SIMD addition operation could add four elements together at a time, which would reduce the number of instructions by a factor of four and speed up execution of the computer program code.

The vectorization module 350 may determine whether a computer program code for performing one or more operations of a geospatial function is eligible for vectorization. In some embodiments, the vectorization module 350 determines that computer program code or a portion of computer program code is eligible for vectorization if the code does not involve branching operations (e.g., an if-else statement in a for loop). The vectorization module 350 may further determine that program code is eligible for vectorization if there is no data dependence between iterations of the code because data dependent iterations cannot be performed in parallel. For example, the (n+1)th iteration of a for loop cannot be performed in parallel with the nth iteration if the (n+1)th iteration depends on the execution of the nth iteration. Additionally, the vectorization module 350 may determine that program code is eligible for vectorization if the code carries out only a small number of operations.

If the computer program code is eligible for vectorization, the vectorization module 350 via a compiler may optimize the code in a manner that uses more efficient processing instructions or allows the parallel processing of multiple entries in the data table. For example, the vectorization module 350 determines that computer program code would iteratively apply a data processing operation (e.g., a geospatial function) to each entry in a data table. However, the vectorization module 350 may also determine that an advanced processing instruction (e.g., a single instruction multiple data (SIMD) operation parallel processing) is available to apply the function to multiple entries in data table (e.g., multiple entries or multiple rows/columns of entries) in parallel. Accordingly, the vectorization module 350 rewrites the computer program code into a vectorized representation of the code capable of processing multiple entries in parallel. The vectorization module 350 compiles the rewritten code into compiled code. The compiled code is thus a vectorized implementation of the geospatial function operations. The vectorization module 350 may provide the compiled code for multiple types of geospatial function operations as a binary library to the cluster computing system 402.

The jobs processing module 340 may maintain and store optimized versions of computer program code for certain functions, which are eligible for vectorization by the vectorization module 350. A detailed description of different techniques for optimizing computer program code such that the vectorization module 350 may generate vectorized implementation of different geospatial functions is described below.

Figure 4:
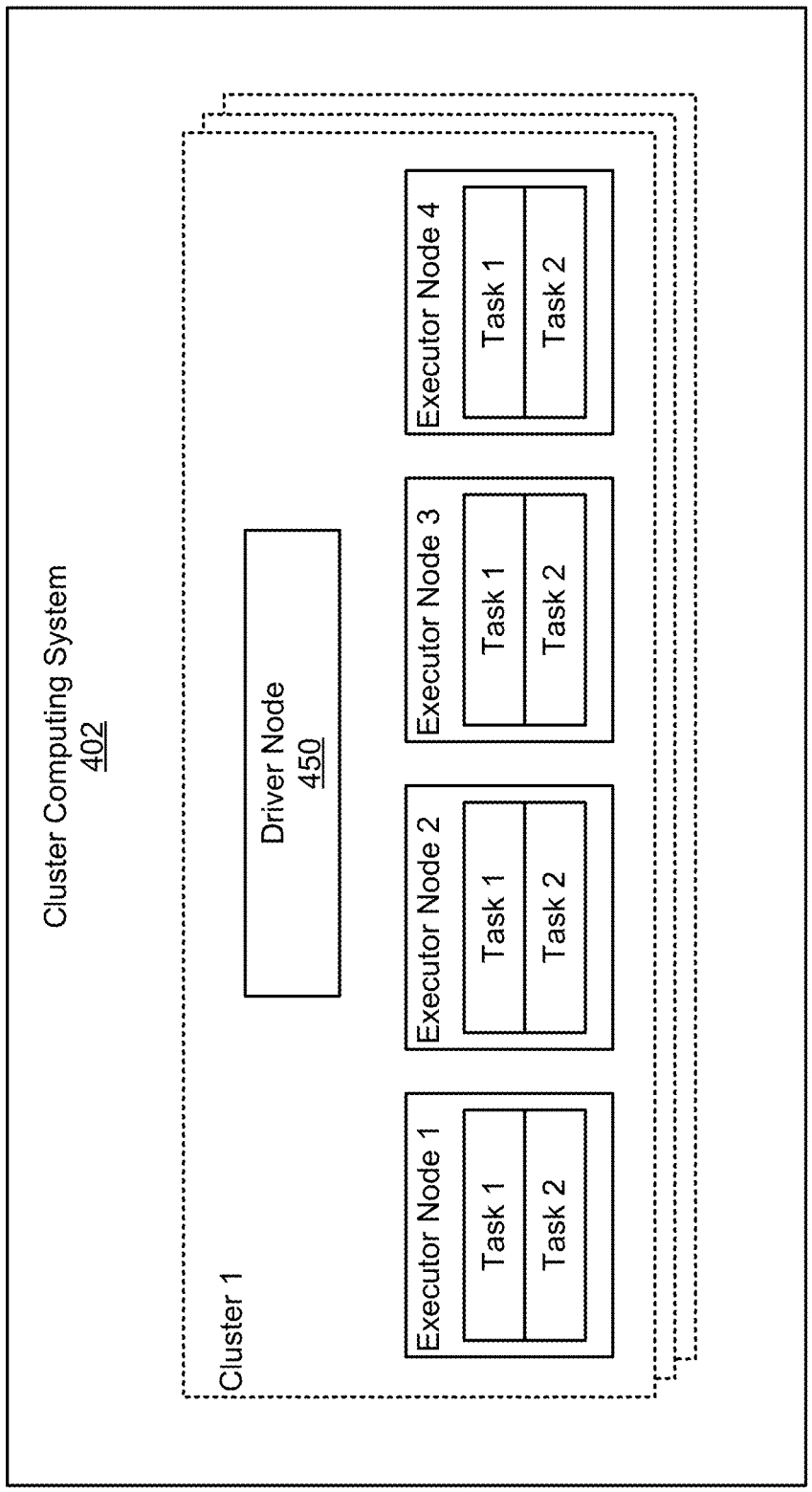
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the jobs processing module 340. The driver node 450 may compile a database query and generate an execution plan. The driver node 450 may then perform a code generation phase to generate executable code based on the execution plan. The driver node 450 distributes the query information including the generated code to the executor nodes, such that the executor nodes execute the query based on the received information. In one embodiment, the driver node 450 compiles the database query into one or more executable tasks and distributes the executable tasks to one or more executor nodes (also referred to herein as "worker nodes"). An executable task may execute the generated code from the code generation phase.

In an example embodiment, the driver node 450 receives a database query with data processing operations including a geospatial function. The driver node 450 determines that a portion of the execution plan corresponding to the geospatial function operation has a vectorized implementation that was compiled from the optimized code. In this case, a vectorized engine in the driver node 450 modifies the execution plan to use the vectorized implementation. The driver node 450 executes the code by calling the native vectorized implementation for that portion of the query. The tasks are distributed to the executor nodes.

The worker pool can include any appropriate number of executor nodes (e.g., 4 executor nodes, 12 executor nodes, 128 nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

In example embodiments where the vectorization module 350 generates a vectorized representation of computer program code, an executor node may access and execute the vectorized representation of the code.

Vectorizing Geospatial Functions

As described above, the effectiveness of a vectorized representation of computer program code depends on the code being considered for vectorization. Accordingly, the vectorization module 350 may store optimized computer program code so that geospatial function operations may be vectorized. In one embodiment, the vectorization module 350 identifies code for one or more geospatial function operations that can be optimized to generate a vectorized implementation when compiled. The vectorization module 350 stores optimized code (e.g., written by a developer) for the geospatial function operation, and compiles the optimized code to generate compiled code. The compiled code vectorizes at least a portion of the operation. Therefore, when a user query is submitted to the driver node 450, the driver node 450 can call the appropriate vectorized implementations during the query compile process, such that these operations can be run faster and with higher computational efficiency.

In one embodiment, the disclosure herein describes three techniques for generating the optimized code: custom kernels, better algorithms, and constant-bounded loops.

1. Custom Kernels

A first technique is to generate optimized code for a geospatial function operation that iteratively applies the geospatial function to each of a batch of data instances. Oftentimes, a geospatial function includes two steps: a first validation step and a second evaluation step. During execution of the validation step, the inputs (e.g., cell index) to the function are at least partially validated. During the evaluation step, the actual evaluation function is called in the function.

FIG. 6A illustrates computer program code 600 for a geospatial function, in accordance with an embodiment. The geospatial function is organized into distinction portions: a validation portion and an evaluation portion. The validation portion checks whether an input cell is within bounds and has a valid resolution. The evaluation portion performs some evaluation function EvalFunction on the input cell and the input resolution. During execution of a query, the code may specify iteratively performing the function of FIG. 6A on a batch of data instances via a for loop. Conventionally, during execution, the execution node applies the geospatial function to a batch of data by iteratively validating and evaluating each geospatial cell index in the batch of data to produce an output. For example, in a batch of data containing 1000 cell indices, the execution node would validate each cell index and perform the computation on (e.g., evaluate) each cell index. However, such functions cannot be vectorized given the computational complexity of a single function that includes both validation operations and evaluation operations.

Accordingly, in one embodiment, the vectorization module 350 stores optimized code that decomposes the computer program code for a geospatial function (e.g., the code 600) by decoupling the validation operation from the actual evaluation operation. Described differently, the optimized code rewrites the original computer program code for the geospatial function as two distinct loops: a first iterative loop for performing the validation operation of the function over a batch of data and a second iterative loop for performing the evaluation portion of the function over the batch of data.

FIG. 6B illustrates computer program code 650 for a decomposed geospatial function operation, in accordance with an embodiment. The vectorization module 350 stores a rewritten version 650 of the original code 600, which includes a first loop (e.g., the top loop) for performing the validation portion of the function over cell indices of a batch of data and a second loop (e.g., the bottom loop) for performing the evaluation portion of the function over the valid cell indices in the batch of data. Specifically, in the first for loop, the ValidateInputs function may refer to the two conditional if statements in FIG. 6A. In the second for loop, the EvaluateFunction may refer to the EvalFunction in FIG. 6A. The code illustrated in FIG. 6B is compiled into binary code.

During execution, an executor node executes the first loop to validate each cell index of a batch of data before executing the second loop to perform the evaluation on each valid cell index. This rewritten code improves the processing efficiency of the computer program code by allowing at least the second evaluation loop to be vectorized. For example, assuming 256-bit registers, four geospatial cells can be processed at once in a given register in a fewer number of instructions compared to when each row is iterated over individually. Given the optimized code 650, the vectorization module 350 compiles the code and generates at least a vectorized implementation of the evaluation loop. Therefore, even if the first loop cannot be vectorized, the execution still has a speedup because the second loop can go through, for example, ¼ of the number of iterations compared to the non-vectorized implementation. Accordingly, the executor node executes the rewritten code for the validation operation for each cell index in a batch of data and subsequently executes the vectorized code for the evaluation operation on each valid cell index.

Figure 7:
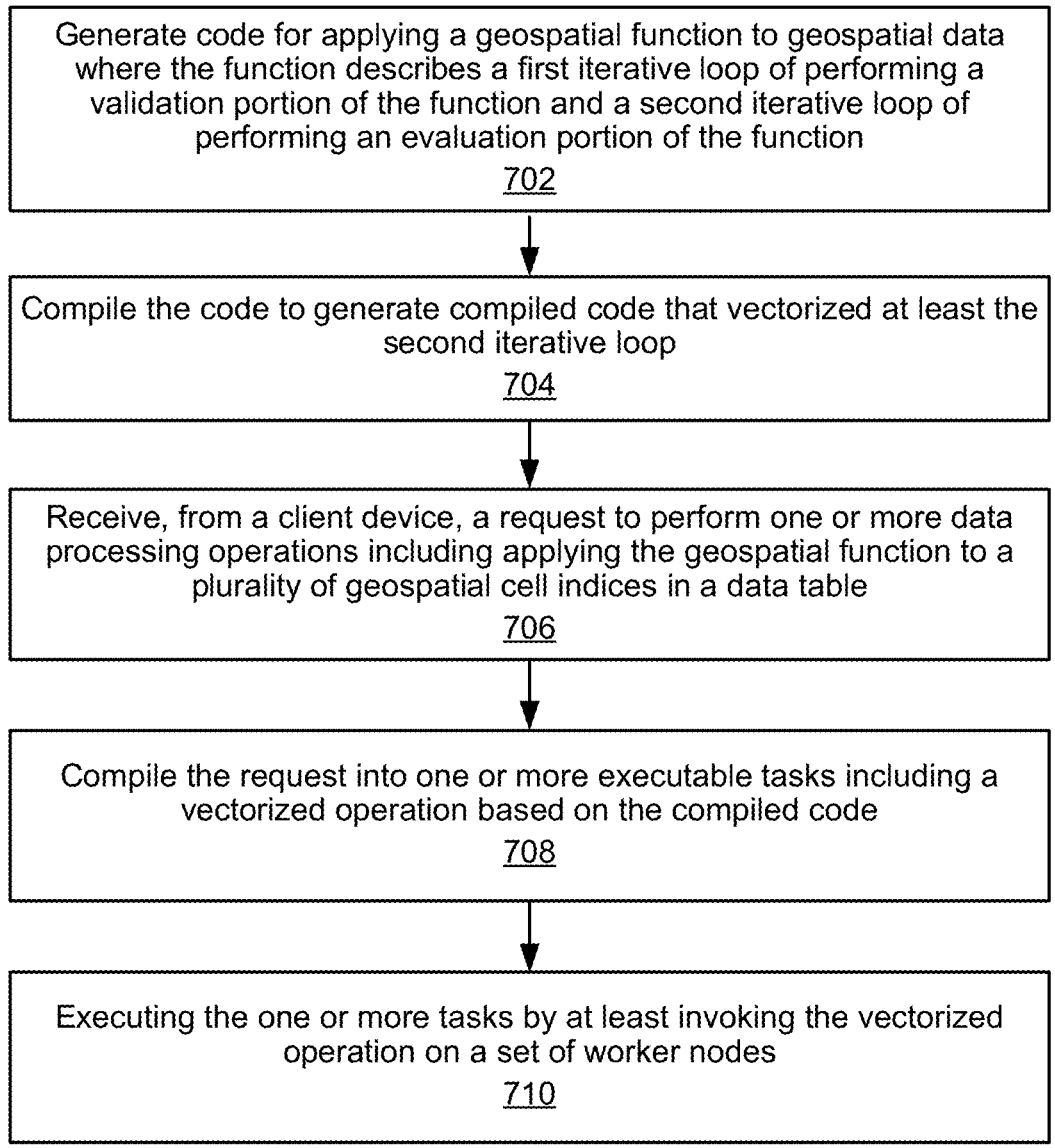
FIG. 7 illustrates a method for executing vectorized code for applying a geospatial function to a batch of data, in accordance with an embodiment.

FIG. 7 illustrates a method for executing vectorized code for applying a geospatial function to a batch of data, in accordance with an embodiment. The process shown in FIG. 7 may be performed by one or more components (e.g., the control layer 106) of a data processing system/service (e.g., the data processing service 102). Other entities may perform some or all of the steps in FIG. 7. Embodiments may include different and/or additional steps, or perform the steps in different orders.

Data processing service 102 generates 702 code for applying a geospatial function to geospatial data. The geospatial function includes at least a validation portion and an evaluation portion. The generated code includes at least a first iterative loop of performing the validation portion over the data and a second iterative loop of performing the evaluation portion over the data. The data processing service 102 compiles 704 the code to generate compiled code that vectorizes at least the second iterative loop.

The data processing service 102 receives 706 a request from a client device to perform one or more data processing operations on a data table that includes at least a plurality of instances of geospatial cell indices. The data processing operations include applying the geospatial function to geospatial cell indices of the data table. The data processing service 102 compiles 708 the request into one or more executable tasks including a vectorized operation based on the compiled code. The data processing service 102 executes 710 the one or more tasks at least by invoking the vectorized operation on the set of worker nodes.

2. Rewriting Geospatial Functions Using Bitwise Operations

As described above with reference to FIGS. 6A-C, a cell index in a geospatial location is a 64-bit integer that includes a resolution digit that identifies the resolution of the cell and Res digits that identify the cell at every resolution from resolution 0 to resolution 15. In one embodiment, certain geospatial functions involve iterating through one or more Res digits during execution via a for loop. For example, a geospatial function may request a target cell index at a different resolution (e.g., a parent cell or a child cell), and executor nodes may conventionally apply the geospatial function by iterating through the Res digits in a 64-bit cell index (e.g. input cell) for each resolution to modify the values to obtain the target output (e.g., parent cell). In standard cell index formats involving fifteen resolutions (resolution 0 to resolution 15), this process requires up to 15 iterations if all 15 Res digits have to be iterated through, where each iteration can invoke one or more instructions. Accordingly, this process is time-consuming; it requires a significant amount of processing capacity and may not be ineligible for vectorization by the vectorization module 350.

In one embodiment, because there are a finite number of target resolutions (e.g., resolutions 0 to 15), the vectorization module 350 may identify geospatial functions that would involve iterating through a set of Res digits during execution. The optimized code transforms the iterative process into one or a combination of bitwise operations using precomputed bit masks. In this manner, the vectorization module 350 may replace the computer program code for applying the geospatial function with a series of bitwise operations to achieve the same target cell index in a more computationally efficient manner. The jobs processing module 340 leverages the one input of the geospatial function—the input cell index—and another input of the function—the target resolution—to replace the computer program code with a series of bitwise operations against precomputed bit masks. Because this optimized computer program code is computationally simpler than the more iterative original computer program code the vectorization module 350 may vectorize the optimized computer program code.

Figures 8A, 8B:
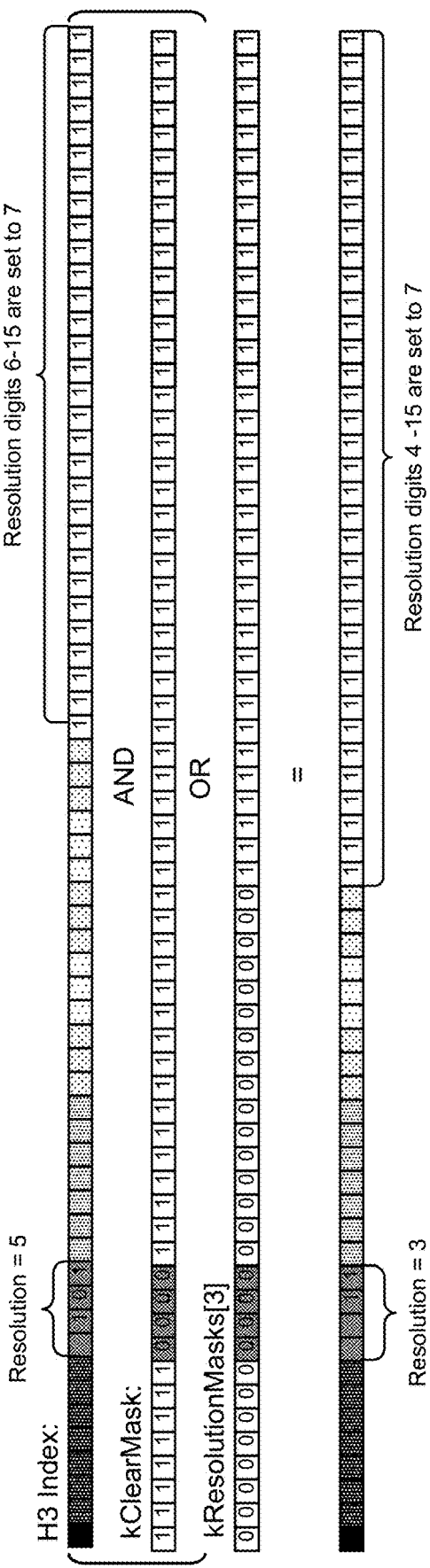
FIG. 8A illustrates computer program code for a standard geospatial function requesting a cell index at different resolution that an input cell index, in accordance with an embodiment.
FIG. 8B illustrates a series of bitwise operations and arrays for determining a cell index at a target resolution in accordance with an embodiment.

FIG. 8A illustrates computer program code for a geospatial function requesting a cell index at different resolution than an input cell index, in accordance with an embodiment. In the illustrated embodiment, the computer program code applies a geospatial function "ToParent," which outputs a target parent cell at a coarser resolution than a given input cell index. As part of the execution of this computer code, the executor node clears the resolution of the input cell index to the target resolution of the desired parent cell index. Moreover, the Res digits for resolutions not used in the target parent cell index are cleared through an iterative process via a for loop. For example, the computer program code may specify an input cell index (e.g., a cell index at resolution 5) and request the cell index of the parent cell at resolution 3. Accordingly, the executor node clears the resolution in the input cell index so that it may be reset to resolution 3 and iterates through the Res digits for each resolution from 4 to 5 to set resolutions 4 to 15 to the invalid value.

Because there are a finite number of resolutions, the jobs processing module 340 generates bit masks (e.g., cell indices representing fixed, predetermined values) for each resolution that are applied in a series of bitwise operations to replace the iterative looping defined in the computer program code. Each series of bitwise operations includes a first "AND" operation between the input cell index and a bit mask "ClearMask" for clearing the resolution bits in the current cell index. The operations also include a second "OR" operation between the result of the AND operation and a "ResolutionMask[target resolution]" for setting unused Res digits to invalid value 7.

FIG. 8B illustrates a series of bitwise operations and arrays for determining a cell index at a target resolution in accordance with an embodiment. The operations in FIG. 8B may represent a portion of the optimized code. In the illustrated embodiment, the input cell index identifies a particular cell index at resolution 5. Therefore, the digits for resolutions 6 to 15 of the input cell index are set to the invalid value 7. The geospatial function calls for the target cell index of the parent cell at resolution 3. Conventionally, the executor node would clear the resolution in the input cell index and then iterate through the Res digits for each of resolutions 4 to 5 of the input cell index to set the values for each resolution to 7.

In one instance, the optimized code performs this process by accessing a first bit mask labeled "ClearMask" and a second bit mask specific to Resolution 3 labeled "ResolutionMask[3]". The vectorization module 350 configures a constant for the bit mask "ClearMask", which is used to clear the resolution in any cell index regardless of the target resolution. The vectorization module 350 defines the resolution digits representing resolution in the "ClearMask" mask as "0000" and defines the digits for each unused resolution in the "ClearMask" mask as the invalid value (e.g., 7). As a result, when the executor node performs an "AND" operation between the input cell index and the "ClearMask" index, the digits corresponding to the resolution in the input cell index are cleared.

For each target resolution 0 to 15, the vectorization module 350 configures a resolution-specific bit mask "ResolutionMask" where the digit for the resolution is set to correspond to the target resolution and defines the digits for each unused resolution as the invalid value (e.g., 7). In the illustrated embodiment, the target resolution is 3, so the executor node accesses the bit mask labeled "ResolutionMask[3]." The resolution digit value in "ResolutionMask[3]" index is set to 3. Additionally, the cell index for any cell at resolution 3 will include invalid values of 7 for the Res digits corresponding to resolutions 4 to 15, which are Res digits for resolutions higher than the target parent resolution. Accordingly, the ResolutionMask[3] index also sets the Res digits corresponding to resolutions 4 to 15 to invalid value 7. Because the digits corresponding to resolutions 0 to 3 will determine the cell index of a cell at resolution 3, the corresponding digits in ResolutionMask[3] are set to 0 (so that they do not modify the existing values in the input cell index).

For the sake of comparison, an index labeled "ResolutionMask[2]" would include a resolution value set to 2, 0's for the digits corresponding to resolution 0 to 2, and invalid values of 7 for the Res digits corresponding to resolutions 3 to 15. As a result, when the executor node performs an "OR" operation with the ResolutionMask index and the cell index resulting from previous "AND" operation, the digits in the resolution for the resolution are set to the target resolution and the digits for unused resolutions are set to invalid value of 7. In this manner, the vectorization module 350 replaces the computationally expensive computer code that would have required up to 15 iterative loops (with one or more instructions for each loop) with a more computationally efficient combination of two logical instructions.

Figure 9:
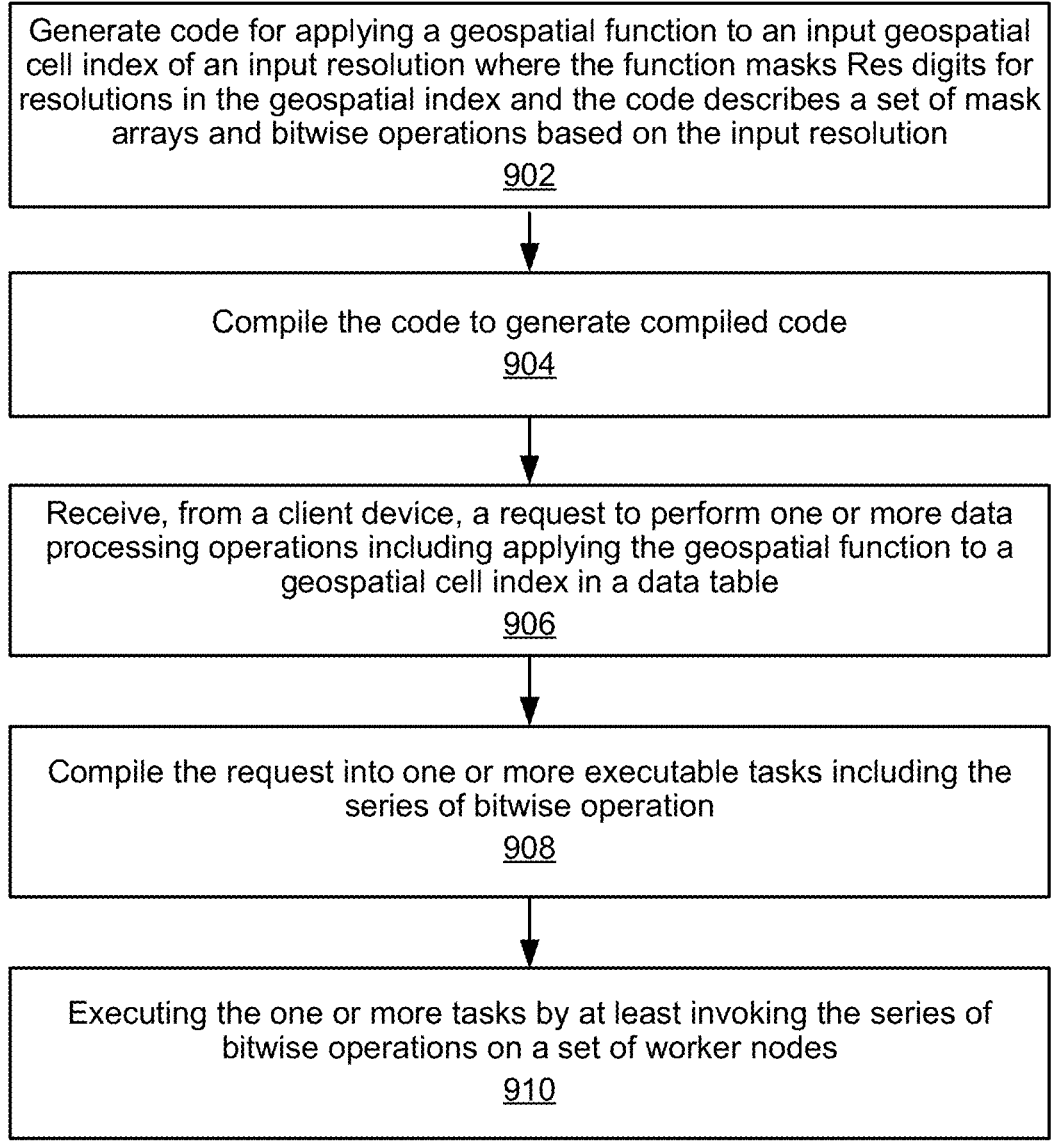
FIG. 9 illustrates a method for executing logical operations for applying a geospatial function to determine a target cell index, in accordance with an embodiment.

FIG. 8C illustrates a vectorization-eligible computer program code for a geospatial function requesting a cell index at a different resolution than an input cell index, in accordance with an embodiment. In the illustrated embodiment, the computer program code executes the geospatial function "ToParent" described in FIG. 8A by performing the two operations illustrated in FIG. 8B on an input cell index. The first line of the computer program code illustrated in FIG. 8C defines a constant. During compilation, the vectorization module 350 evaluates the first line of program code and replaces any instance of the defined constant with the bit mask "ClearMask". Accordingly, the vectorization module 350 evaluates the constants at compile time and replaces any mention of the constant with the actual value. The second line of the illustrated computer program code is a combination of the "AND" and "OR" function described above. The vectorization module 350 first performs the "OR" operation on the input cell index and the ClearMask index and then performs the "AND" operation on the index resulting from the OR operation and the predetermined ResolutionMask index corresponding to the specified target resolution as described above FIG. 9 illustrates a method for executing logical operations for applying a geospatial function to determine a target cell index, in accordance with an embodiment. The process shown in FIG. 9 may be performed by one or more components (e.g., the control layer 106) of a data processing system/service (e.g., the data processing service 102). Other entities may perform some or all of the steps in FIG. 9. Embodiments may include different and/or additional steps, or perform the steps in different orders.

Data processing service 102 generates 902 code for applying a geospatial function to an input geospatial cell index of an input resolution. The geospatial function masks Res digits for one or more resolution in the input geospatial cell index. The generated code describes a set of bit masks and a series of bitwise operations based on the input resolution in the input cell index. The data processing service 102 compiles 904 the code to generate compiled code.

The data processing service 102 receives 906 a request from a client device to perform one or more data processing operations on a data table that includes at least a plurality of instances of geospatial cell indices. The data processing operations include applying the geospatial function to geospatial cell indices of the data table. The data processing service 102 compiles 908 the request into one or more executable tasks by invoking the series of bitwise operations generated based on the compiled code. The data processing service 102 executes 910 the one or more tasks at least by invoking the series of bitwise operations on a set of worker nodes.

3. Unwrapping Geospatial Functions for Vectorization

As described above with reference to FIGS. 5A-C, a cell index in a geospatial location is a 64-bit integer that includes a resolution digit that identifies the resolution of a cell and Res digits that identify the resolution of the cell at every resolution from resolution 0 to 15. In one embodiment, the generated code for certain geospatial functions iterates through one or more Res digits, similarly to the examples shown in FIGS. 8A-8B. However, the for loop may still not be vectorizable because the for loop is based on a runtime variable.

For example, the generated code for a geospatial function may verify that the Res digits for resolutions for $r=1$ through $r<res$, where res is a variable, of a given cell index are valid (e.g., the computer program code illustrated in FIG. 10A). For such geospatial functions, executor nodes conventionally apply the geospatial function by iteratively validating the Res digits for each applicable resolution. For example, during execution, the geospatial function may validate a cell index at resolution $res=3$ by first validating the Res digit for resolution 0, then validating the Res digit for resolution 1, then the Res digit for resolution 2, and finally the Res digit for resolution 3 in sequence. However, because res is a runtime variable, the computer checks at each iteration of the loop whether the current value of r is less than or equal to res. Because of this dependency, the iterative loop may not be vectorized when compiled. Accordingly, this process is time-consuming and can require a significant amount of processing capacity.

Because geospatial functions typically process a finite number of iterations equivalent to at most the number of available resolutions in the cell index (e.g., 16 resolutions), an optimized code may be generated where distinct executable functions replace the iterative loop of such a geospatial function. In particular, in the optimized code, the bound of the iterative loop is represented as a compile-time constant ("kResolution") that can take on one of 16 different constant values (each corresponding to a different resolution) to generate 16 different executable functions at compile time. The executable function for the desired resolution is selected for execution at runtime. The compiler treats the compile-time constant as a constant instead of a variable, so the loop of an executable function is a constant-bounded loop. This enables optimization of loop unrolling where the compiler generates all the instructions that would have been carried out at runtime for a given resolution value, eliminating the overheads needed to control the loop at runtime, such as checking for the end of the loop.

Returning to the previously described validation function, a distinct executable function for validating the Res digits for a cell index of a desired resolution. For cell indices involving 16 resolutions (e.g., resolution 0 through resolution 15), the optimized code may formulate the iterative loop by representing the desired resolution as a compile-time constant instead of a runtime variable. When compiled, 16 different variations of the executable function will be generated, where each executable function validates the Res digits of an input geospatial cell index up to the desired resolution of the input geospatial cell. When compiled, 16 distinct executable functions for validating the Res digits for 16 different input cell resolutions will be generated.

That is, one function validating the Res digits of an input cell of resolution 0, another function validating the Res digits of an input cell of resolution 1, another function validating the Res digits of an input cell of resolution 2, and so on will be generated until the function for an input cell of a final resolution (e.g., resolution 15). Accordingly, given the resolution specified in the input geospatial cell index, only the version of the executable function that maps to the resolution of the input geospatial cell index is executed. For example, if a geospatial function is applied to validate a cell index at resolution 3, the executable function for resolution 3 is executed. Since each of the executable functions have all the instructions that would be carried out at runtime, the vectorization module 350 can further generate a vectorized implementation.

FIG. 10A illustrates computer program code for a geospatial function for checking whether an input geospatial cell is a valid cell, in accordance with an embodiment. In the illustrated embodiment, the compute program code includes at least a for loop that iteratively applies a validation check to each Res index from resolution 1 to res in a cell index, where res is a resolution of the input cell index and is a runtime variable. Accordingly, an executor node would execute the code illustrated in FIG. 10A by iteratively applying the validation function to each Res digit of every resolution 1 through res in the cell index.

FIG. 10B illustrates computer program code for unwrapping an iterative validation function, in accordance with an embodiment. As described herein, "unwrapping" refers to the processing described above where during compile time, the iterative geospatial function is mapped to several distinct vectorized implementations by the vectorization module 350. In the optimized code illustrated in FIG. 10B, the vectorization module 350 specifies a template parameter ("kResolution") which identifies the resolution of the input cell index and is a compile-time constant instead of a variable. Based on this template parameter, the appropriate executable function is selected that corresponds to the resolution of the input cell index. For example, if the template parameter specifies the resolution of the input cell index is resolution 2, the executor node will identify the executable function for resolution 2 via, for example, a switch statement.

The vectorization module 350 generates a vectorized representation of the identified validation function and the executor node executes the vectorized representation. For example, for kResolution=5, the iterative loop shown in FIG. 10B can be vectorized such that operations for i=2, 3, 4, 5 can be performed in parallel, instead of sequentially performing separate instructions for each iteration. For example, for the operation (value & kDigitMasks[i]), one register may hold 4 identical copies of the input cell index (assuming 64-bit integers and a 256-bit register) and another register may be loaded with kDigitMasks[2], kDigitMasks[3], kDigitMasks[4], kDigitMasks[5], where kDigitMask[i] is a 64-bit integer where only the Res digit for resolution i is set to "111" and the remaining bits are 0's. In this manner, even though the switch statement may be relatively costly, the vectorization of the iterative loop allows to exploit properties of the resolution of the input cell index, such that the computation can be performed in fewer instructions and computational resources.

Figure 11:
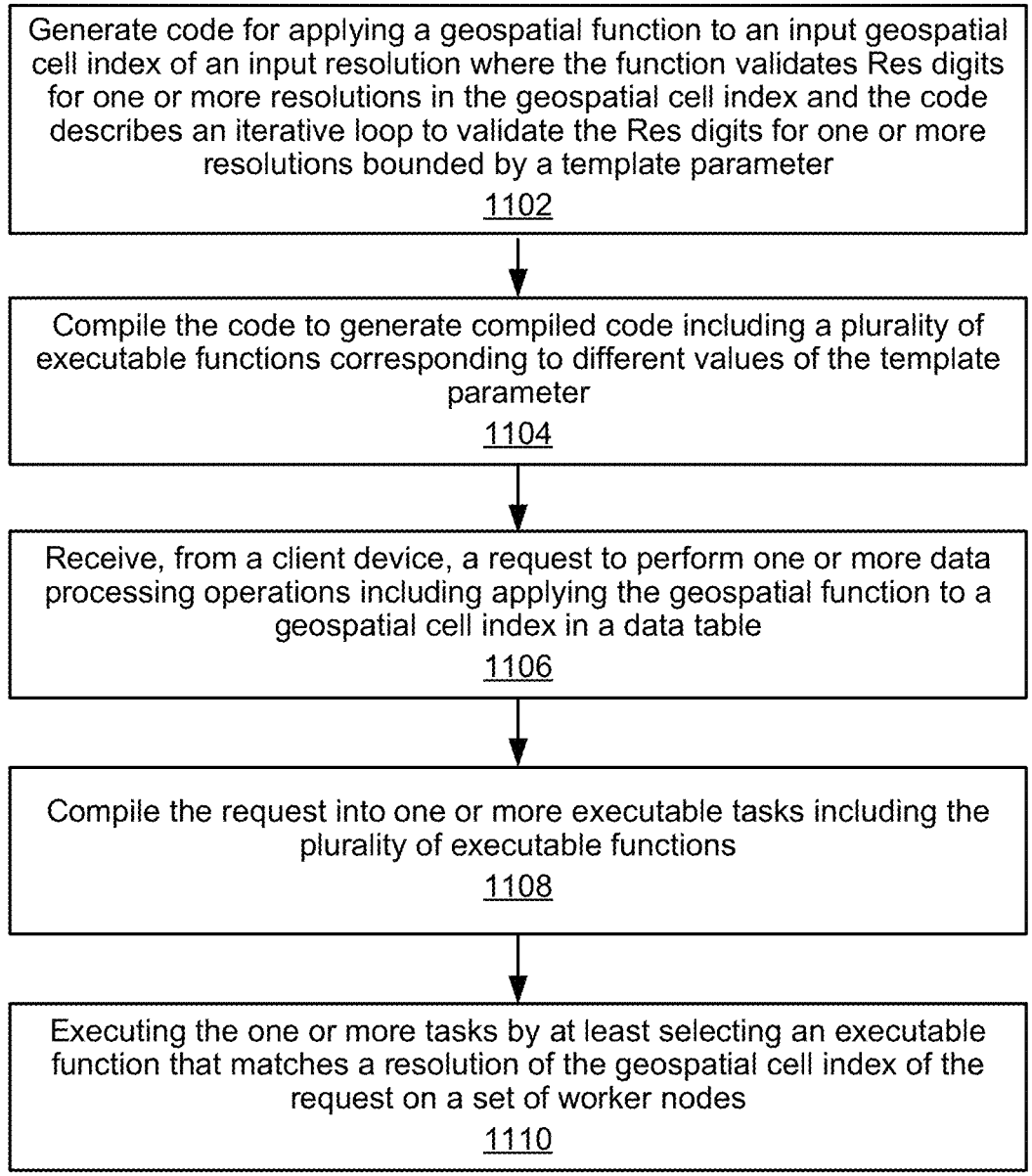
FIG. 11 illustrates a method for executing vectorized code for applying an iterative geospatial function to a batch of data, in accordance with an embodiment.

FIG. 11 illustrates a method for executing vectorized code for applying an iterative geospatial function to a batch of data, in accordance with an embodiment. The process shown in FIG. 11 may be performed by one or more components (e.g., the control layer 106) of a data processing system/service (e.g., the data processing service 102). Other entities may perform some or all of the steps in FIG. 11. Embodiments may include different and/or additional steps, or perform the steps in different orders.

Data processing service 102 generates 1102 code for applying a geospatial function to a geospatial cell index of an input resolution. The geospatial function validates Res digits for one or more resolutions in the geospatial cell index. The generated code describes an iterative loop to validate the Res digits for the one or more resolutions that is bounded by a template parameter. The data processing service 102 compiles 1104 the code to generate compiled code. The compiled code generates a plurality of executable functions corresponding to different values of the template parameter.

The data processing service 102 receives 1106 a request from a client device to perform one or more data processing operations on a data table that includes at least a plurality of instances of geospatial cell indices. The data processing operations include applying the geospatial function to geospatial cell indices of the data table. The data processing service 102 compiles 1108 the request into one or more executable tasks including the plurality of executable functions generated based on the code. The data processing service 102 executes 1110 the one or more tasks at least by selecting an executable function that matches a resolution of the geospatial cell index and invoking the executable function on a set of worker nodes.

SUMMARY

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method, comprising:
generating code for iteratively applying a geospatial function to geospatial data, wherein the geospatial function includes at least a validation portion and an evaluation portion, wherein the code includes at least a first iterative loop of performing the validation portion over the data and a second iterative loop of performing the evaluation portion over the data;
compiling the code to generate compiled code, wherein the compiled code vectorizes at least the second iterative loop;
receiving, from a client device, a request to perform one or more data processing operations on a data table, the data table including at least a plurality of instances of geospatial cell indices, wherein the one or more data processing operations includes applying the geospatial function to the plurality of instances;
compiling, by a driver node, the request into one or more tasks for execution on a set of worker nodes, wherein the set of tasks includes at least a vectorized operation based on the compiled code; and
executing the one or more tasks by at least invoking the vectorized operation on the set of worker nodes.

2. The method of claim 1, wherein the first iterative loop of the generated code validates each geospatial cell index or input values related to each geospatial cell index in the data table and the second iterative loop of the generated code performs an evaluation function on each valid cell index in the data table.

3. The method of claim 2, wherein executing the one or more executable tasks comprises:
executing the generated code to perform the first iterative loop of performing the validation operation over the data table; and
executing the compiled code to perform the second iterative loop of performing the evaluation operation over the data table.

4. The method of claim 1, wherein the one or more data processing operations further includes applying a second geospatial function to a geospatial cell index of the data table, the method further comprising:

generating second code for applying a second geospatial function to an input geospatial cell index of an input resolution to mask Res digits for one or more resolutions in the input geospatial cell index, wherein the second code describes a set of precomputed mask indices and a series of bitwise operations based on the input resolution in the input cell index;
compiling the second code to generate compiled code; and
executing the one or more tasks by at least invoking the series of bitwise operations on the set of worker nodes.

5. The method of claim 4, wherein the second geospatial function is applied to a geospatial cell index to identify a target cell index in the data table.

6. The method of claim 1, wherein the one or more data processing operations further includes applying a third geospatial function to a geospatial cell index of the data table, the method further comprising:
generating third code for applying the third geospatial function to a geospatial cell index of an input resolution to validate Res digits for one or more resolutions in the geospatial cell index, wherein the third code describes an iterative loop to validate the Res digits for the one or more resolutions that is bounded by a template parameter;
compiling the third code to generate compiled code, wherein the compiled code generates a plurality of executable functions corresponding to different values of the template parameter; and
executing the one or more tasks by at least selecting an executable function that matches a resolution of the geospatial cell index of the request and invoking the executable function on the set of worker nodes.

7. The method of claim 1, wherein the first code describes a geospatial function for determining the validity of a geospatial cell index or input values related to each geospatial cell index.

8. A non-transitory computer-readable storage medium storing instructions that, when executed by a processor, cause the processor to:
generate code for iteratively applying a geospatial function to geospatial data, wherein the geospatial function includes at least a validation portion and an evaluation portion, wherein the code includes at least a first iterative loop of performing the validation portion over the data and a second iterative loop of performing the evaluation portion over the data;
compile the code to generate compiled code, wherein the compiled code vectorizes at least the second iterative loop;
receive, from a client device, a request to perform one or more data processing operations on a data table, the data table including at least a plurality of instances of geospatial cell indices, wherein the one or more data processing operations includes applying the geospatial function to the plurality of instances;
compile, by a driver node, the request into one or more tasks for execution on a set of worker nodes, wherein the set of tasks includes at least a vectorized operation based on the compiled code; and
executing the one or more tasks by at least invoking the vectorized operation on the set of worker nodes.

9. The non-transitory computer-readable storage medium of claim 8, wherein the first iterative loop of the generated code validates each geospatial cell index or input values related to each geospatial cell index in the data table and the second iterative loop of the generated code performs an evaluation function on each valid cell index in the data table.

10. The non-transitory computer-readable storage medium of claim 9, further comprising instructions that cause the processor to:
execute the generated code to perform the first iterative loop of performing the validation operation over the data table; and
execute the compiled code to perform the second iterative loop of performing the evaluation operation over the data table.

11. The non-transitory computer-readable storage medium of claim 8, wherein the one or more data processing operations further includes applying a second geospatial function to a geospatial cell index of the data table, further comprising instructions that cause the processor to:
generate second code for applying the second geospatial function to an input geospatial cell index of an input resolution to mask Res digits for one or more resolutions in the input geospatial cell index, wherein the second code describes a set of mask arrays and a series of bitwise operations based on the input resolution in the input cell index;
compile the second code to generate compiled code; and
execute the one or more tasks by at least invoking the series of bitwise operations on the set of worker nodes.

12. The non-transitory computer-readable storage medium of claim 11, wherein the second geospatial function is applied to the geospatial cell index to identify a target cell index in the data table.

13. The non-transitory computer-readable storage medium of claim 8, wherein the one or more data processing operations further includes applying a third geospatial function to a geospatial cell index of the data table, The non-transitory computer-readable storage medium of claim 8:
generate third code for applying a third geospatial function to a geospatial cell index of an input resolution to validate Res digits for one or more resolutions in the geospatial cell index, wherein the third code describes an iterative loop to validate the Res digits for the one or more resolutions that is bounded by a template parameter;
compile the third code to generate compiled code, wherein the compiled code generates a plurality of executable functions corresponding to different values of the template parameter; and
execute the one or more tasks by at least selecting an executable function that matches a resolution of the geospatial cell index of the request and invoking the executable function on the set of worker nodes.

14. The non-transitory computer-readable storage medium of claim 8, wherein the first code describes a geospatial function for determining the validity of a geospatial cell index or input values related to each geospatial cell index.

15. A system comprising:
a processor; and
a non-transitory computer-readable storage medium storing instructions that, when executed by a processor, cause the processor to:
generate code for iteratively applying a geospatial function to geospatial data, wherein the geospatial function includes at least a validation portion and an evaluation portion, wherein the code includes at least a first iterative loop of performing the validation portion over the data and a second iterative loop of performing the evaluation portion over the data;
compile the code to generate compiled code, wherein the compiled code vectorizes at least the second iterative loop;
receive, from a client device, a request to perform one or more data processing operations on a data table, the data table including at least a plurality of instances of geospatial cell indices, wherein the one or more data processing operations includes applying the geospatial function to the plurality of instances;
compile, by a driver node, the request into one or more tasks for execution on a set of worker nodes, wherein the set of tasks includes at least a vectorized operation based on the compiled code; and
executing the one or more tasks by at least invoking the vectorized operation on the set of worker nodes.

16. The system of claim 15, wherein the first iterative loop of the generated code validates each geospatial cell index or input values related to each geospatial cell index in the data table and the second iterative loop of the generated code performs an evaluation function on each valid cell index in the data table.

17. The system of claim 15, further comprising instructions that cause the processor to:
execute the generated code to perform the first iterative loop of performing the validation operation over the data table; and
execute the compiled code to perform the second iterative loop of performing the evaluation operation over the data table.

18. The system of claim 15, wherein the one or more data processing operations further includes applying a second geospatial function to a geospatial cell index of the data table, further comprising instructions that cause the processor to:
generate second code for applying the second geospatial function to an input geospatial cell index of an input resolution to mask Res digits for one or more resolutions in the input geospatial cell index, wherein the second code describes a precomputed set of mask indices and a series of bitwise operations based on the input resolution in the input cell index;
compile the second code to generate compiled code; and
execute the one or more tasks by at least invoking the series of bitwise operations on the set of worker nodes.

19. The system of claim 18, wherein the second geospatial function is applied to the geospatial cell index to identify a target cell index in the data table.

20. The system of claim 15, wherein the one or more data processing operations further includes applying a third geospatial function to a geospatial cell index of the data table, further comprising instructions that cause the processor to:
generate third code for applying a third geospatial function to a geospatial cell index of an input resolution to validate Res digits for one or more resolutions in the geospatial cell index, wherein the third code describes an iterative loop to validate the Res digits for the one or more resolutions that is bounded by a template parameter;
compile the third code to generate compiled code, wherein the compiled code generates a plurality of executable functions corresponding to different values of the template parameter; and
execute the one or more tasks by at least selecting an executable function that matches a resolution of the geospatial cell index of the request and invoking the executable function on the set of worker nodes.

\* \* \* \* \*